(12) United States Patent
Katayose

(10) Patent No.: US 11,249,291 B2
(45) Date of Patent: Feb. 15, 2022

(54) ZOOM LENS AND IMAGE PICKUP APPARATUS INCLUDING THE SAME

(71) Applicant: CANON KABUSHIKI KAISHA, Tokyo (JP)

(72) Inventor: Masato Katayose, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 175 days.

(21) Appl. No.: 16/690,399

(22) Filed: Nov. 21, 2019

(65) Prior Publication Data

US 2020/0174234 A1 Jun. 4, 2020

(30) Foreign Application Priority Data

Nov. 30, 2018 (JP) .............................. JP2018-224739

(51) Int. Cl.
*G02B 15/14* (2006.01)
*G02B 15/20* (2006.01)

(52) U.S. Cl.
CPC ......... *G02B 15/1461* (2019.08); *G02B 15/20* (2013.01)

(58) Field of Classification Search
CPC .............. G02B 15/20; G02B 15/1461; G02B 15/1451; G02B 15/145113; G02B 15/145121; G02B 15/1441; G02B 9/60; G02B 9/62; G02B 9/64
USPC ....................................................... 359/648
See application file for complete search history.

(56) References Cited

U.S. PATENT DOCUMENTS

| 2009/0190220 A1* | 7/2009 | Sato ............... G02B 15/145121 |
| | | 359/557 |
| 2014/0368699 A1 | 12/2014 | Morooka et al. |
| 2017/0329112 A1 | 11/2017 | Koga |
| 2018/0284406 A1 | 10/2018 | Iwamoto |
| 2018/0299652 A1 | 10/2018 | Inomoto |
| 2018/0372993 A1 | 12/2018 | Katayose |

(Continued)

FOREIGN PATENT DOCUMENTS

| CN | 103901588 A | 7/2014 |
| JP | 2007192858 A | 8/2007 |

OTHER PUBLICATIONS

Notification of the First Office Action issued by the China National Intellectual Property Administration dated Jun. 10, 2021 in corresponding CN Patent Application No. 201911169431, with English translation.

(Continued)

*Primary Examiner* — Kristina M Deherrera
(74) *Attorney, Agent, or Firm* — Carter, DeLuca & Farrell LLP

(57) ABSTRACT

Provided is a zoom lens consisting of, in order from an object side to an image side, a first lens unit having a positive refractive power, a second lens unit having a negative refractive power, a third lens unit having a positive refractive power, and a rear lens group including a plurality of lens units, and an interval between each pair of adjacent lens units is changed during zooming. When the rear lens group includes a lens unit Ln disposed closest to the image side among lens units including at least one positive lens and at least one negative lens, the first lens unit and the lens unit Ln are configured to move for zooming. The first lens unit includes, in order from the object side to the image side, a first positive lens, a second positive lens, and a first negative lens.

14 Claims, 9 Drawing Sheets

(56) References Cited

U.S. PATENT DOCUMENTS

2019/0113721 A1    4/2019   Katayose
2019/0265441 A1    8/2019   Katayose

OTHER PUBLICATIONS

Extended European Search Report issued by the European Patent Office dated Apr. 16, 2020 in corresponding European Patent Application No. 19208938.1.
Communication issued by the European Patent Office dated Apr. 30, 2021 in corresponding EP Patent Application No. 19208938.1.

\* cited by examiner

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, which are suitable for an image pickup optical system of an image pickup apparatus using an image pickup element, such as a digital still camera, a video camera, a broadcasting camera, and a monitoring camera.

Description of the Related Art

In recent years, a zoom lens to be used for an image pickup apparatus has been required to have a short total lens length and a high zoom ratio, and have a high optical performance over an entire zoom range. In particular, in a telephoto zoom lens having a long focal length, a large axial chromatic aberration and chromatic aberration of magnification tend to occur among various kinds of aberrations, and thus it is important to correct the chromatic aberrations to achieve a higher quality image.

As the telephoto zoom lens, there is known a zoom lens including, in order from an object side to an image side, a lens unit having a positive refractive power, a lens unit having a negative refractive power, a lens unit having a positive refractive power, and a rear lens group including a plurality of subsequent lens units (Japanese Patent Application Laid-Open No. 2007-192858 and US Patent Application Publication No. 2017/0329112).

In order to downsize a zoom lens in the telephoto zoom lens, it is effective to strengthen the refractive power of each lens unit forming the zoom lens. For example, in the zoom lens, it is particularly effective to strengthen the refractive power of a first lens unit in order to reduce the total lens length at a telephoto end.

However, in the telephoto zoom lens, various kinds of aberrations that have occurred in the first lens unit are increased by the rear lens group arranged closer to the object side than the first lens unit, and thus it is important to appropriately set the lens configuration and refractive power of the first lens unit to satisfactorily correct the aberrations. For example, when the refractive power of the first lens unit is set to be too large, a large chromatic aberration occurs, resulting in a difficulty in achieving a higher quality image.

SUMMARY OF THE INVENTION

The present invention has an object to provide a compact zoom lens with a high zoom ratio, which has such a high optical performance that a chromatic aberration is satisfactorily corrected at a telephoto end in particular.

According to one aspect of the present invention, a zoom lens includes, in order from an object side to an image side: a first lens unit having a positive refractive power; a second lens unit having a negative refractive power; a third lens unit having a positive refractive power; and a rear lens group including a plurality of lens units, wherein an interval between each pair of adjacent lens units is changed during zooming, in which the rear lens group includes a lens unit Ln disposed closest to the image side among lens units including a positive lens and a negative lens, the first lens unit and the lens unit Ln are configured to move for zooming, in which the first lens unit includes, in order from the object side to the image side, a first positive lens, a second positive lens, and a first negative lens, and in which the following conditional expressions are satisfied:

$$0.20 < f1/ft < 0.45; \text{ and}$$

$$-0.15 < fn/ft < -0.05,$$

where f1 is a focal length of the first lens unit, fn is a focal length of the lens unit Ln, and ft is a focal length of the zoom lens at a telephoto end.

Further features of the present invention will become apparent from the following description of exemplary embodiments with reference to the attached drawings.

DESCRIPTION OF THE EMBODIMENTS

A zoom lens according to embodiments of the present invention includes, in order from an object side to an image side: a first lens unit having a positive refractive power; a second lens unit having a negative refractive power; a third lens unit having a positive refractive power; and a rear lens group including a plurality of lens units. Intervals between adjacent lens units are changed during zooming.

Figure 1:
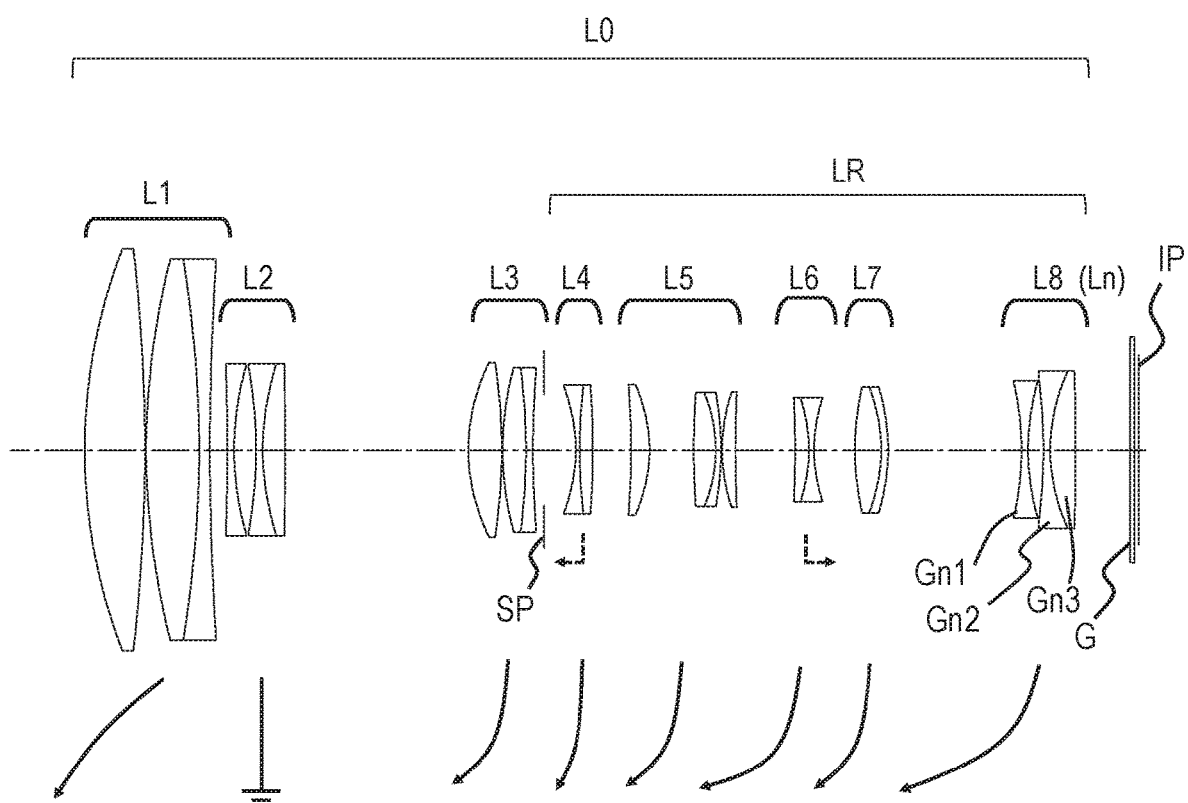
FIG. 1 is a lens cross-sectional view of a zoom lens according to Embodiment 1 of the present invention when the zoom lens is focused at infinity at a wide angle end.
Figure 2A:
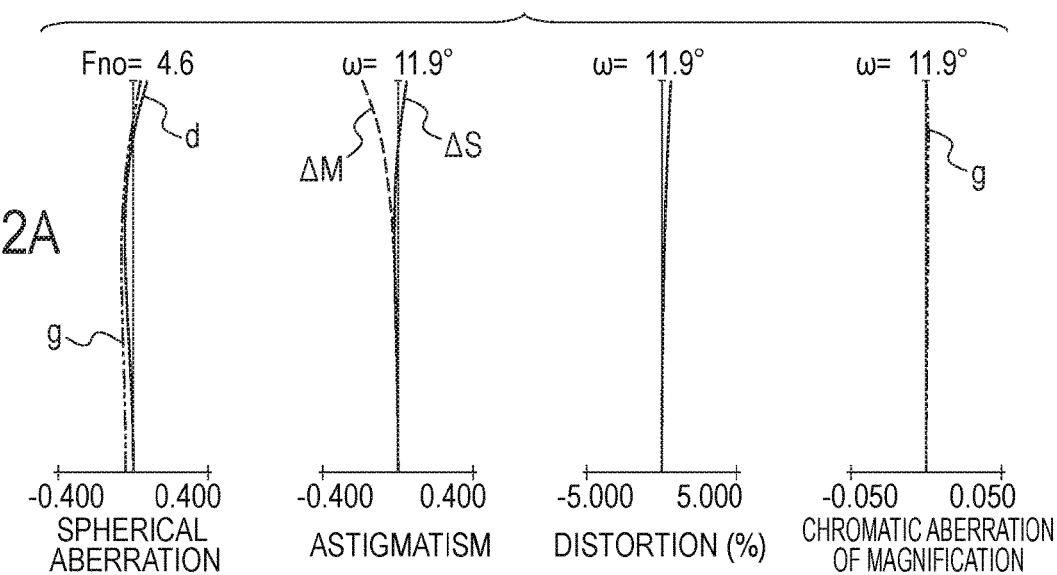
FIG. 2A shows aberration diagrams of the zoom lens according to Embodiment 1 of the present invention when the zoom lens is focused at infinity at the wide angle end.
Figure 2B:
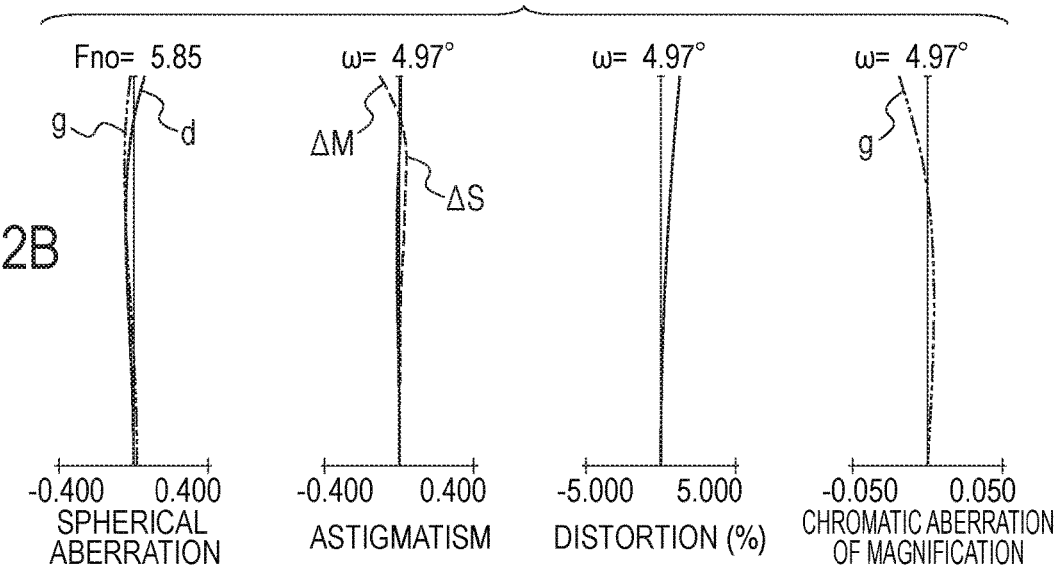
FIG. 2B shows aberration diagrams of the zoom lens according to Embodiment 1 of the present invention when the zoom lens is focused at infinity at an intermediate zoom position (f=248.7 mm).
Figure 2C:
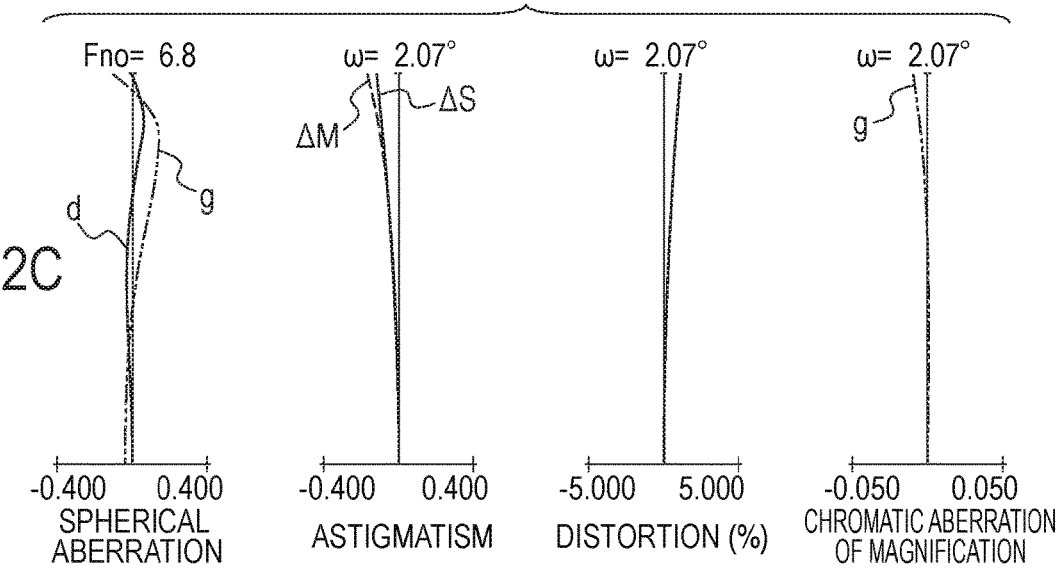
FIG. 2C shows aberration diagrams of the zoom lens according to Embodiment 1 of the present invention when the zoom lens is focused at infinity at a telephoto end.

FIG. 1 is a lens cross-sectional view of a zoom lens according to Embodiment 1 of the present invention at a wide angle end. FIG. 2A, FIG. 2B, and FIG. 2C show aberration diagrams of the zoom lens according to Embodiment 1 at the wide angle end, at an intermediate zoom position, and at a telephoto end, respectively. Embodiment 1 represents a zoom lens having a zoom ratio of 5.83 and an F-number of from 4.60 to 6.80.

Figure 3:
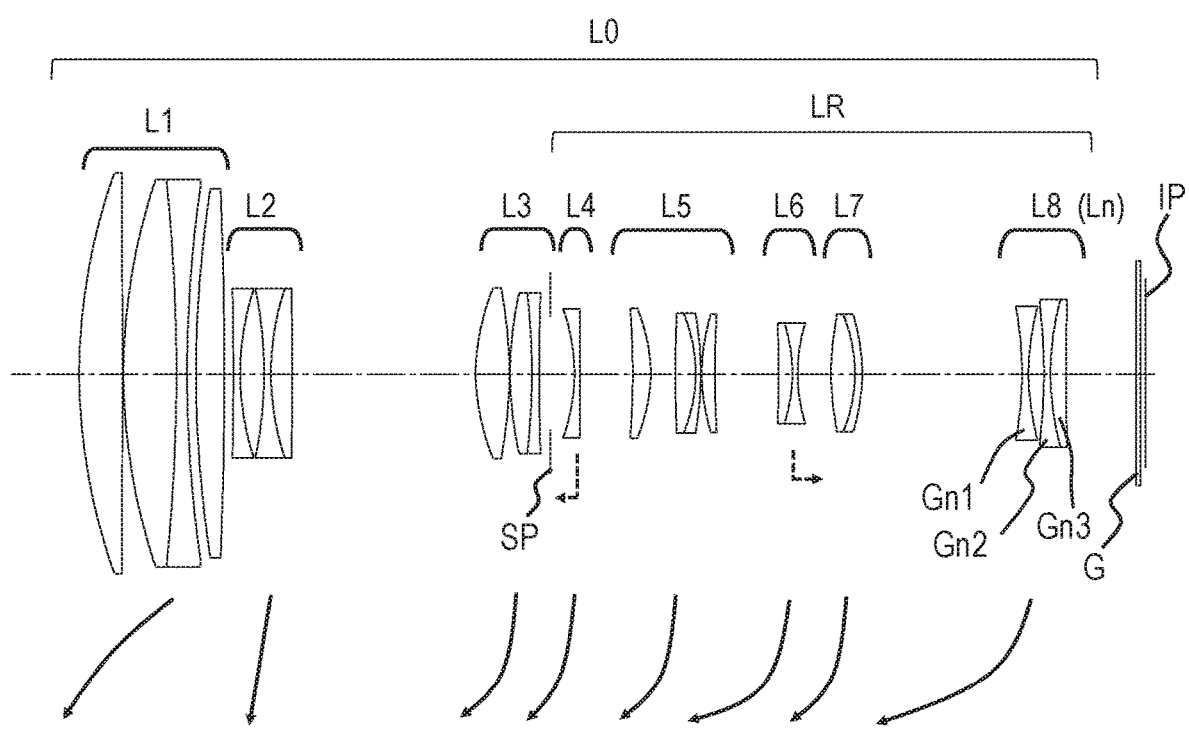
FIG. 3 is a lens cross-sectional view of a zoom lens according to Embodiment 2 of the present invention when the zoom lens is focused at infinity at a wide angle end.
Figure 4A:
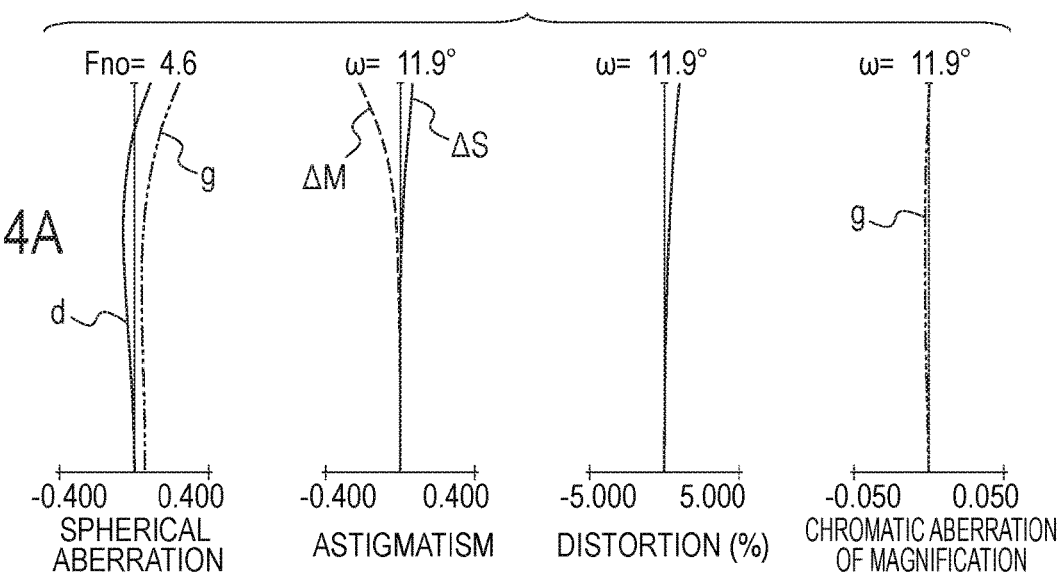
FIG. 4A shows aberration diagrams of the zoom lens according to Embodiment 2 of the present invention when the zoom lens is focused at infinity at the wide angle end.
Figure 4B:
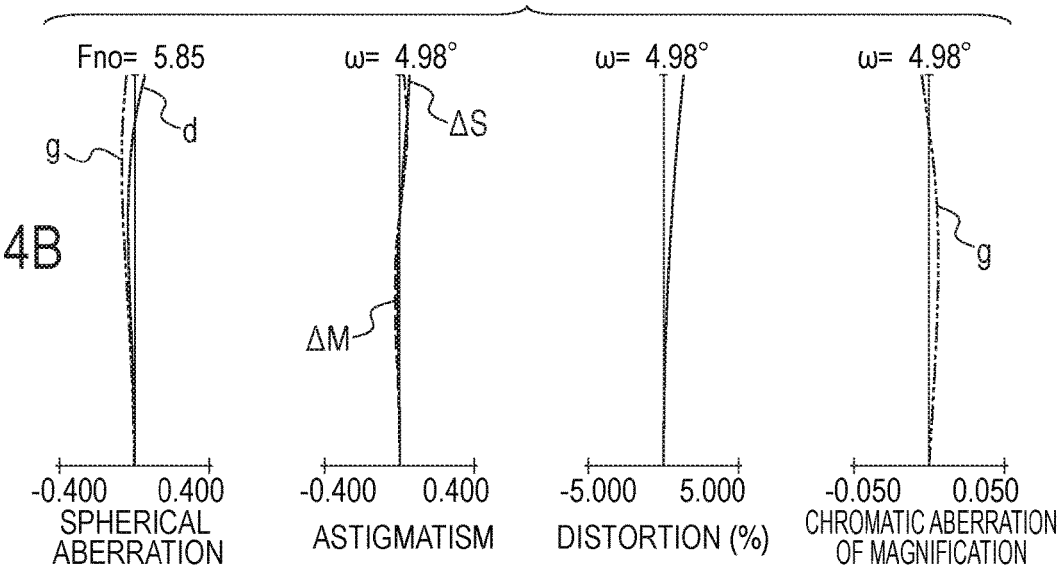
FIG. 4B shows aberration diagrams of the zoom lens according to Embodiment 2 of the present invention when the zoom lens is focused at infinity at an intermediate zoom position (f=248.5 mm).
Figure 4C:
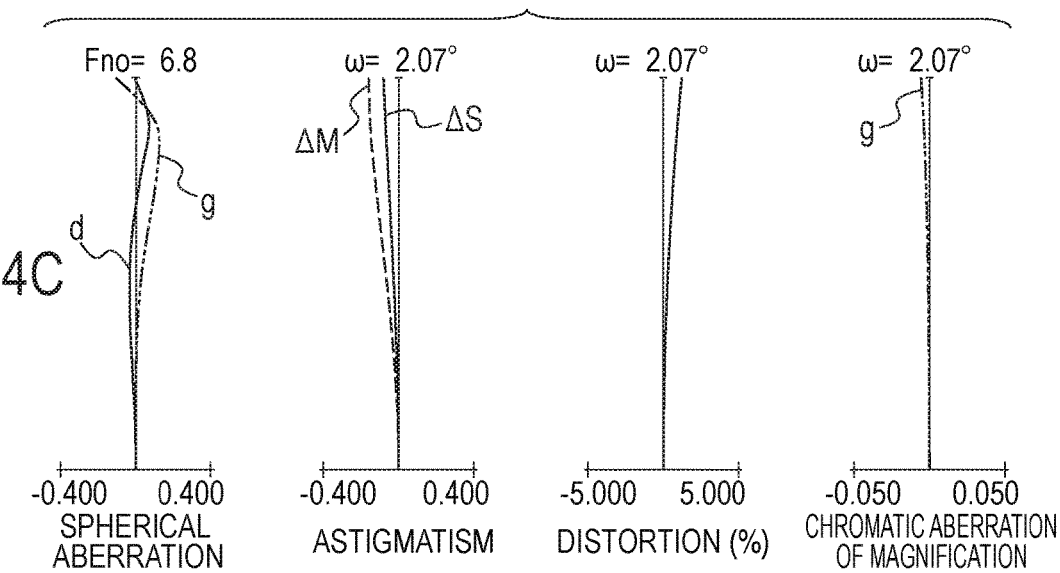
FIG. 4C shows aberration diagrams of the zoom lens according to Embodiment 2 of the present invention when the zoom lens is focused at infinity at a telephoto end.

FIG. 3 is a lens cross-sectional view of a zoom lens according to Embodiment 2 of the present invention at a wide angle end. FIG. 4A, FIG. 4B, and FIG. 4C show aberration diagrams of the zoom lens according to Embodiment 2 at the wide angle end, at an intermediate zoom position, and at a telephoto end, respectively. Embodiment 2 represents a zoom lens having a zoom ratio of 5.83 and an F-number of from 4.60 to 6.80.

Figure 5:
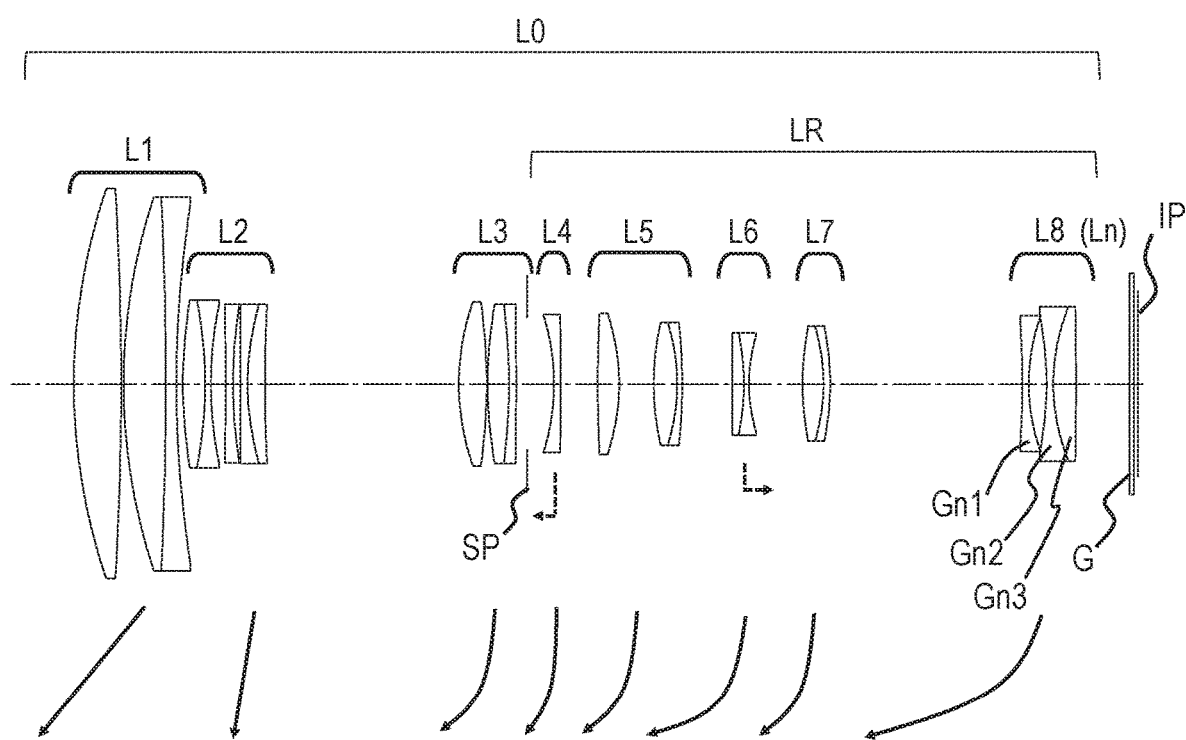
FIG. 5 is a lens cross-sectional view of a zoom lens according to Embodiment 3 of the present invention when the zoom lens is focused at infinity at a wide angle end.
Figure 6A:
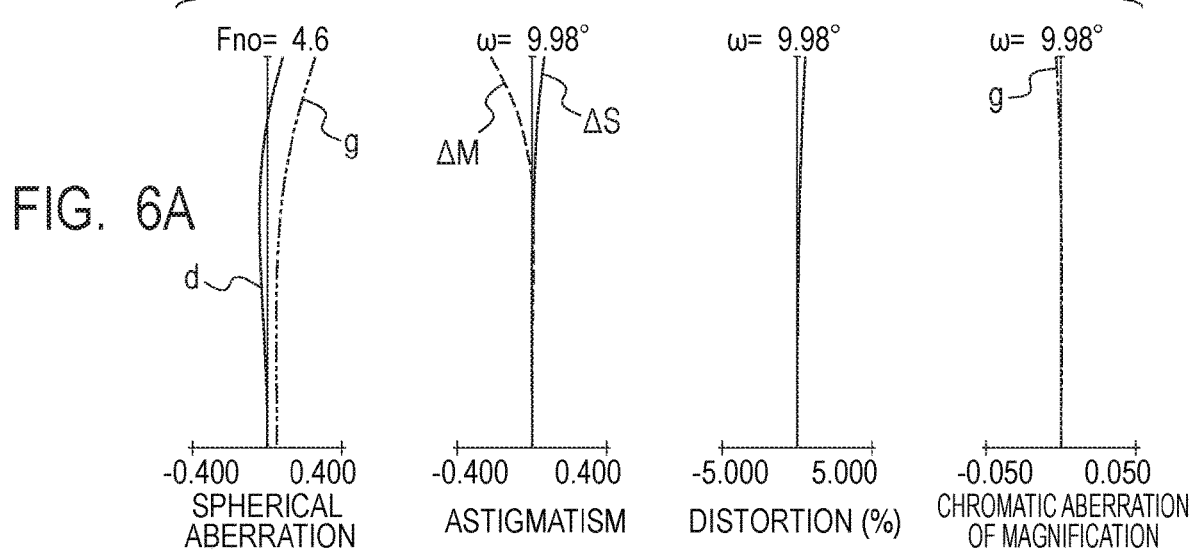
FIG. 6A shows aberration diagrams of the zoom lens according to Embodiment 3 of the present invention when the zoom lens is focused at infinity at the wide angle end.
Figure 6B:
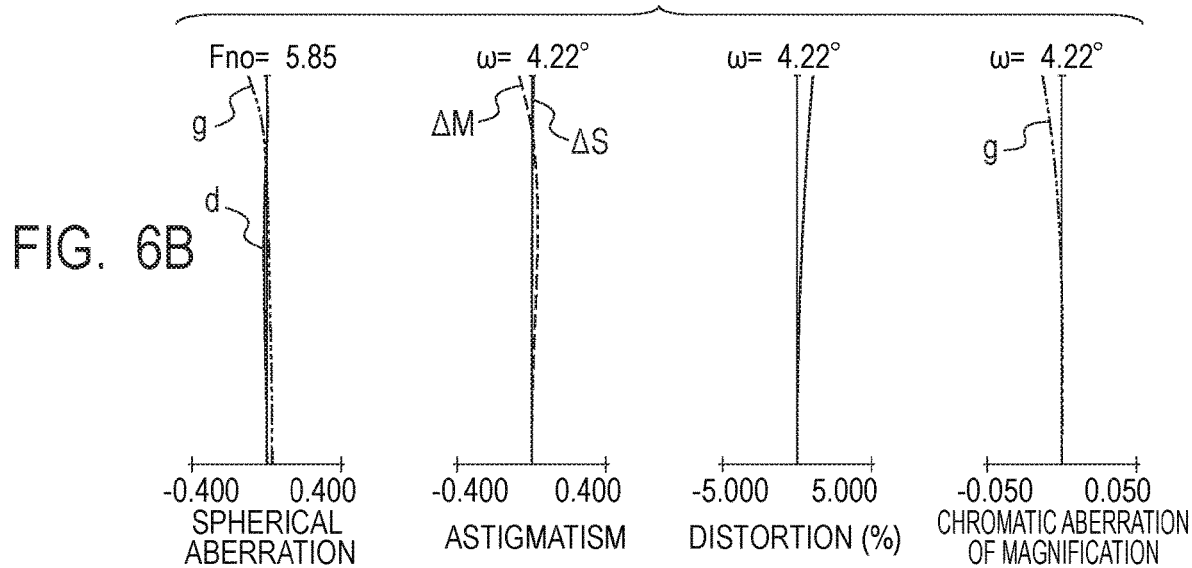
FIG. 6B shows aberration diagrams of the zoom lens according to Embodiment 3 of the present invention when the zoom lens is focused at infinity at an intermediate zoom position (f=293.0 mm).
Figure 6C:
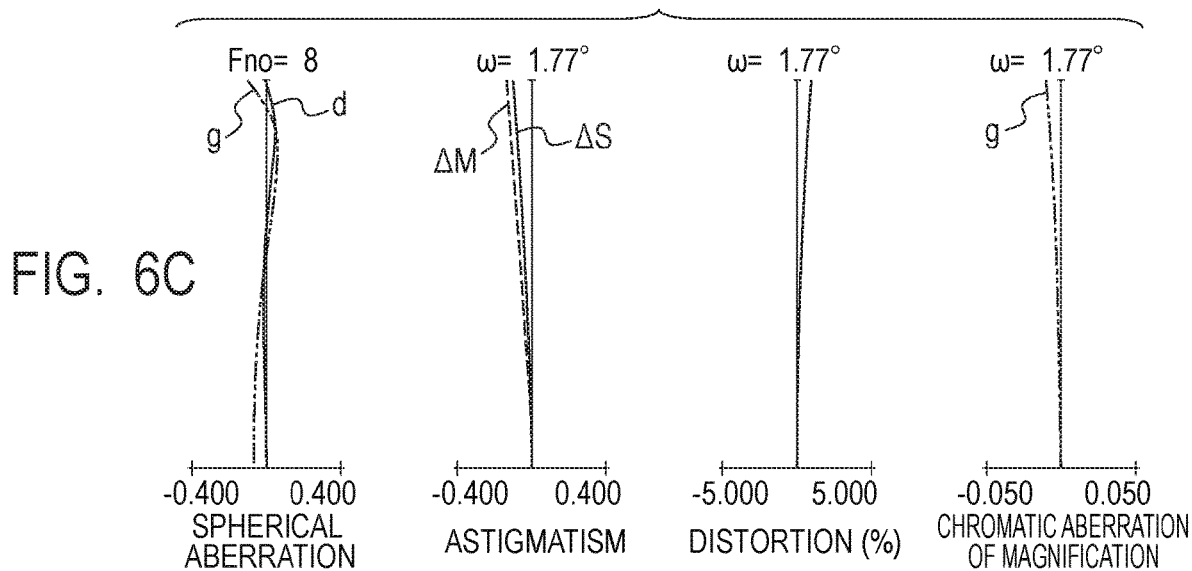
FIG. 6C shows aberration diagrams of the zoom lens according to Embodiment 3 of the present invention when the zoom lens is focused at infinity at a telephoto end.

FIG. 5 is a lens cross-sectional view of a zoom lens according to Embodiment 3 of the present invention at a wide angle end. FIG. 6A, FIG. 6B, and FIG. 6C show aberration diagrams of the zoom lens according to Embodiment 3 at the wide angle end, at an intermediate zoom position, and at a telephoto end, respectively. Embodiment 3 represents a zoom lens having a zoom ratio of 5.69 and an F-number of from 4.60 to 8.00.

Figure 7:
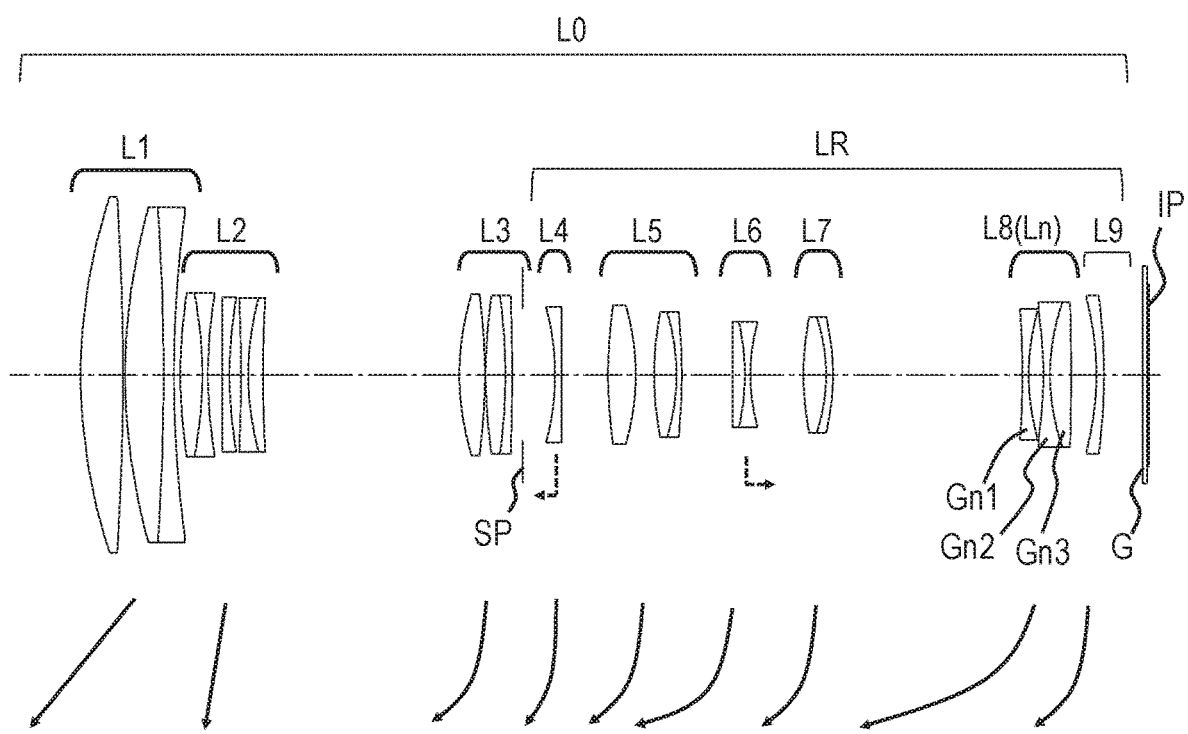
FIG. 7 is a lens cross-sectional view of a zoom lens according to Embodiment 4 of the present invention when the zoom lens is focused at infinity at a wide angle end.
Figure 8A:
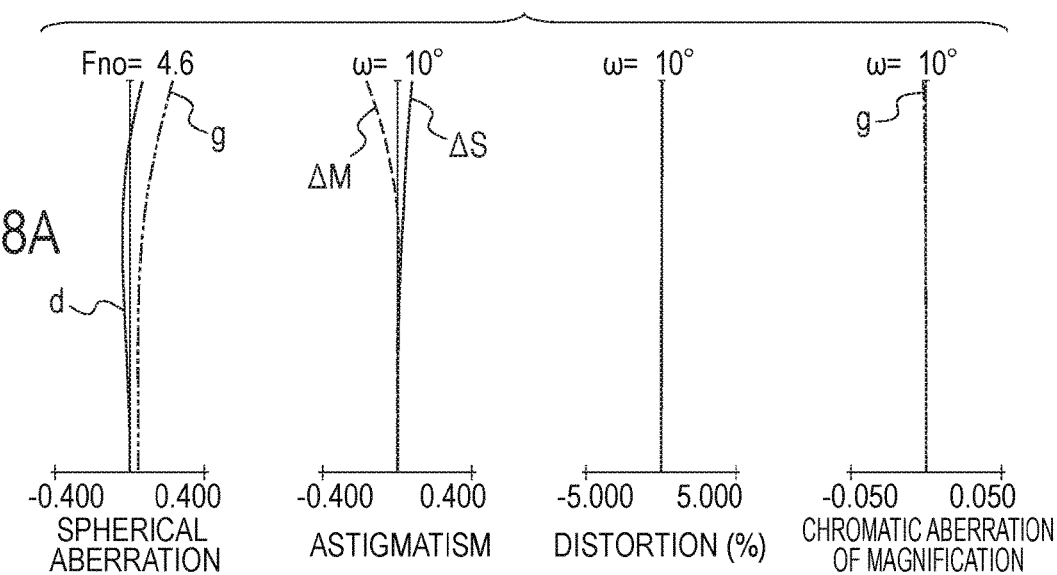
FIG. 8A shows aberration diagrams of the zoom lens according to Embodiment 4 of the present invention when the zoom lens is focused at infinity at the wide angle end.
Figure 8B:
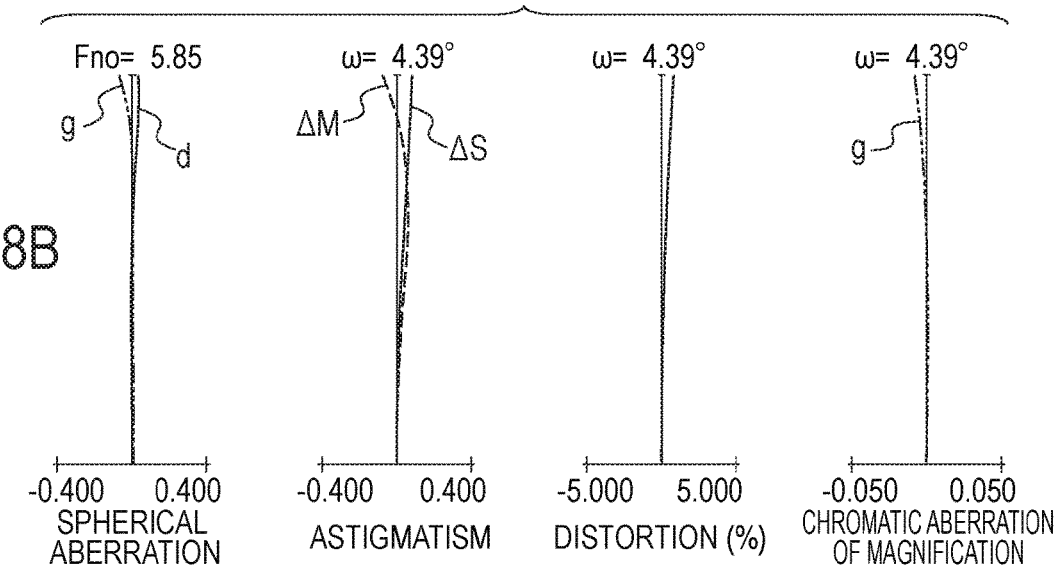
FIG. 8B shows aberration diagrams of the zoom lens according to Embodiment 4 of the present invention when the zoom lens is focused at infinity at an intermediate zoom position (f=282.0 mm).
Figure 8C:
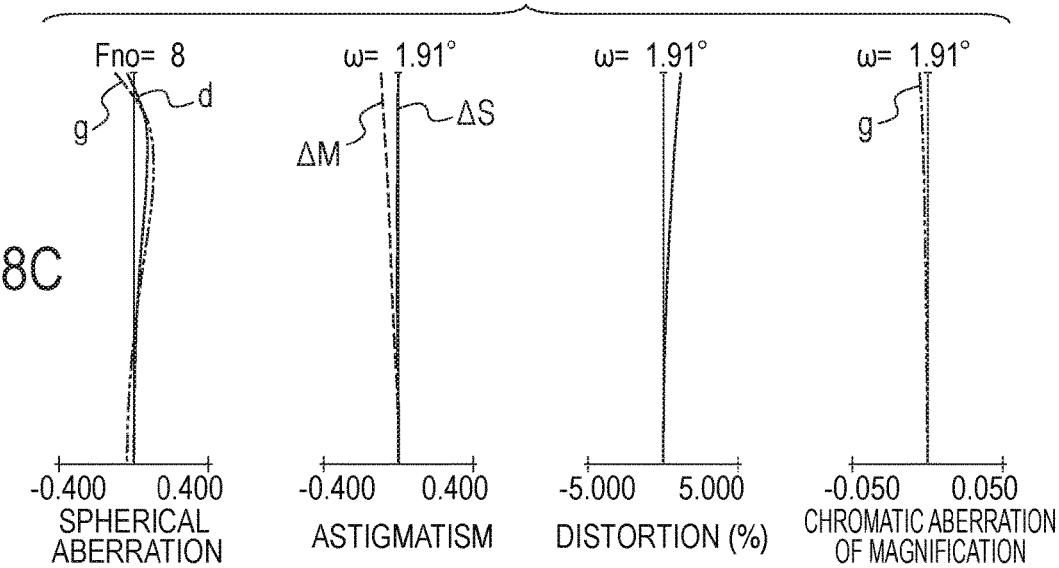
FIG. 8C shows aberration diagrams of the zoom lens according to Embodiment 4 of the present invention when the zoom lens is focused at infinity at a telephoto end.

FIG. 7 is a lens cross-sectional view of a zoom lens according to Embodiment 4 of the present invention at a wide angle end. FIG. 8A, FIG. 8B, and FIG. 8C show aberration diagrams of the zoom lens according to Embodiment 4 at the wide angle end, at an intermediate zoom position, and at a telephoto end, respectively. Embodiment 4 represents a zoom lens having a zoom ratio of 5.30 and an F-number of from 4.60 to 8.00.

Figure 9:
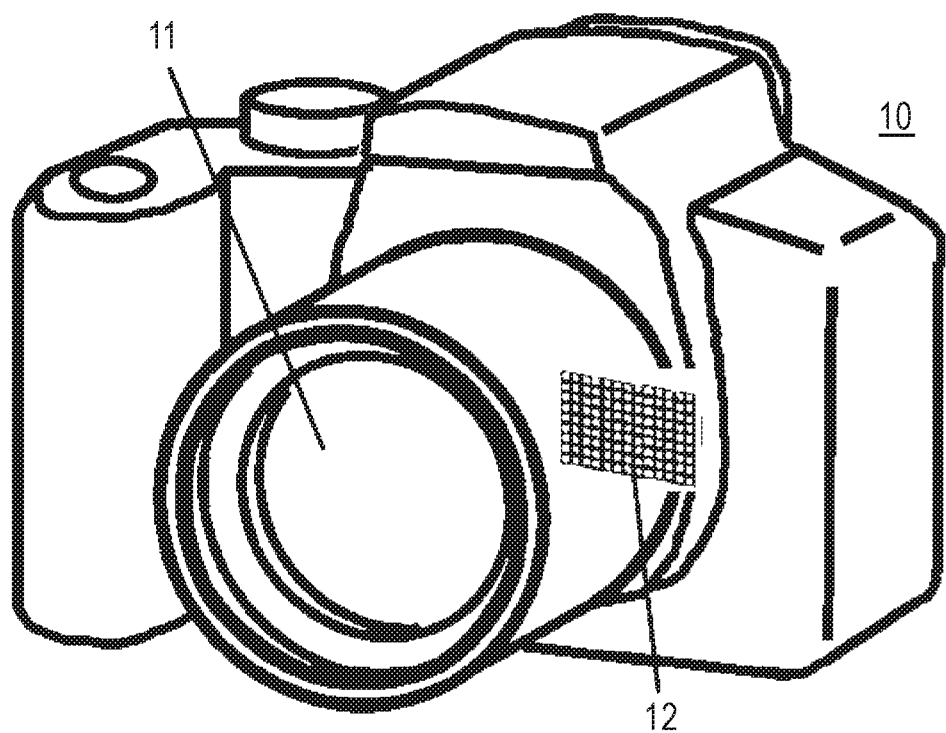
FIG. 9 is a schematic view of a main part of an image pickup apparatus according to at least one embodiment of the present invention.

FIG. 9 is a schematic view of a main part of an image pickup apparatus according to at least one embodiment of the present invention.

The zoom lens according to each Embodiment is an image pickup optical system for use in image pickup apparatus such as a video camera, a digital camera, a television (TV) camera, and a monitoring camera. In the lens cross-sectional views, the left side is the object side (front), and the right side is the image side (rear). In the lens cross-sectional views, L0 represents a zoom lens. The order of a lens unit from the object side is represented by "i", and an i-th lens unit is represented by Li. A rear lens group is represented by LR. A lens unit closest to the image side among lens units including a positive lens and a negative lens of the rear lens group LR is represented by Ln.

In the lens cross-sectional views of Embodiment 1 to Embodiment 3, L1 represents a first lens unit having a positive refractive power, L2 represents a second lens unit having a negative refractive power, and L3 represents a third lens unit having a positive refractive power. LR represents a rear lens group including a plurality of lens units. The rear lens group LR consists of, in order from the object side to the image side, a fourth lens unit L4 having a negative refractive power, a fifth lens unit L5 having a positive refractive power, a sixth lens unit L6 having a negative refractive power, a seventh lens unit L7 having a positive refractive power, and an eighth lens unit L8 having a negative refractive power. The eighth lens unit L8 is a lens unit Ln. In Embodiment 1 to Embodiment 3, the zoom lens L0 is an eight-unit zoom lens including eight lens units.

In the lens cross-sectional view of Embodiment 4, L1 represents a first lens unit having a positive refractive power, L2 represents a second lens unit having a negative refractive power, and L3 represents a third lens unit having a positive refractive power. LR represents a rear lens group including a plurality of lens units. The rear lens group LR consists of, in order from the object side to the image side, a fourth lens unit L4 having a negative refractive power, a fifth lens unit L5 having a positive refractive power, a sixth lens unit L6 having a negative refractive power, a seventh lens unit L7 having a positive refractive power, an eighth lens unit L8 having a negative refractive power, and a ninth lens unit L9 having a negative refractive power. The eighth lens unit L8 is a lens unit Ln. In Embodiment 4, the zoom lens L0 is a nine-unit zoom lens including nine lens units.

In the lens cross-sectional views, an aperture stop SP is configured to determine (restrict) a ray at an open f-number (Fno), and is arranged between the third lens unit L3 and the fourth lens unit L4.

In the lens cross-sectional views, an optical element G corresponds to an optical filter, a face plate, a crystal low-pass filter, an infrared cut filter, or the like. An image plane IP is an image pickup plane of an image pickup element (photoelectric conversion element) such as a CCD sensor and a CMOS sensor when the zoom lens is used as an image pickup optical system of a video camera or a digital still camera.

In the aberration diagrams, Fno represents an f-number, and "ω" represents a half angle of view (degrees) of an image pickup angle of view, which is an angle of view in terms of a ray tracing value. In the spherical aberration diagrams, "d" represents a d-line (wavelength: 587.56 nm), and "g" represents a g-line (wavelength: 435.8 nm). In the astigmatism diagrams, a solid line ΔS represents a sagittal image plane at the d-line, and a dotted line ΔM represents a meridional image plane at the d-line. The distortion is indicated with respect to the d-line. In the diagrams of the chromatic aberration of magnification, "g" represents the g-line. In each Embodiment given below, the wide angle end and the telephoto end refer to respective zoom positions at a time when lens units for varying magnification are positioned at both ends of a range in which the lens units are mechanically movable on an optical axis.

In each Embodiment, each lens unit is moved as indicated by the solid line during zooming from the wide angle end to the telephoto end.

Specifically, in Embodiment 1, the first lens unit L1 is configured to move toward the object side during zooming from the wide angle end to the telephoto end. The second lens unit L2 is configured not to move during zooming. The third lens unit L3 is configured to move toward the object side. The aperture stop SP and the third lens unit L3 are configured to move in an integrated manner. The fourth lens unit L4 is configured to move toward the object side. The fifth lens unit L5 is configured to move toward the object side. The sixth lens unit L6 is configured to move toward the object side. The seventh lens unit L7 is configured to move toward the object side. The eighth lens unit L8 is configured to move toward the object side. The third lens unit L3, the fifth lens unit L5, and the seventh lens unit L7 are configured to move along the same locus during zooming.

In Embodiments 2 and 3, the first lens unit L1 is configured to move toward the object side during zooming from the wide angle end to the telephoto end. The second lens unit L2 is configured to move toward the object side. The third lens unit L3 is configured to move toward the object side. The aperture stop SP and the third lens unit L3 are configured to move in an integrated manner. The fourth lens unit L4 is configured to move toward the object side. The fifth lens unit L5 is configured to move toward the object side. The sixth lens unit L6 is configured to move toward the object side. The seventh lens unit L7 is configured to move toward the object side. The eighth lens unit L8 is configured to move toward the object side. The third lens unit L3, the fifth lens unit L5, and the seventh lens unit L7 are configured to move along the same locus during zooming.

In Embodiment 4, the first lens unit L1 is configured to move toward the object side during zooming from the wide angle end to the telephoto end. The second lens unit L2 is configured to move toward the object side. The third lens unit L3 is configured to move toward the object side. The aperture stop SP and the third lens unit L3 are configured to move in an integrated manner. The fourth lens unit L4 is configured to move toward the object side. The fifth lens unit L5 is configured to move toward the object side. The sixth lens unit L6 is configured to move toward the object side. The seventh lens unit L7 is configured to move toward the object side. The eighth lens unit L8 is configured to move toward the object side. The ninth lens unit L9 is configured to move toward the object side. The third lens unit L3, the fifth lens unit L5, and the seventh lens unit L7 are configured to move along the same locus during zooming.

In each Embodiment, the fourth lens unit L4 and the sixth lens unit L6 are moved along separate loci to correct variation in image plane due to zooming and to perform focusing. Focusing from infinity to close distance is performed by moving the fourth lens unit L4 forward (toward object side) as indicated by the dotted arrow and moving the sixth lens unit L6 backward (toward image side). Focusing may be performed without using the fourth lens unit L4 and the sixth lens unit L6, and may be performed by using another lens unit alone or a plurality of lenses.

In Embodiment 1 to Embodiment 4, the lens unit Ln consists of three lenses, namely, an n1 lens having a negative refractive power, an n2 lens having a negative refractive power, and an n3 lens having a positive refractive power, in order from the object side to the image side.

In each Embodiment, the zoom lens L0 consists of, in order from the object side to the image side, the first lens unit L1 having a positive refractive power, the second lens unit L2 having a negative refractive power, the third lens unit L3 having a positive refractive power, and the rear lens group LR including a plurality of lens units, and an interval between adjacent lens units is changed during zooming.

A lens unit closest to the image side among zoom lenses including one or more positive lenses and one or more negative lenses of the rear lens group LR is set as the lens unit Ln. The first lens unit L1 and the lens unit Ln are configured to move during zooming, and the first lens unit L1 includes, in order from the object side to the image side, a first positive lens having a positive refractive power, a second positive lens having a positive refractive power, and a first negative lens having a negative refractive power. The focal length of the first lens unit L1 is represented by f1, the focal length of the lens unit Ln is represented by "fn", and the focal length of the zoom lens at the telephoto end is represented by "ft".

At this time, the following conditional expressions are satisfied.

$$0.20 < f1/ft < 0.45 \quad (1)$$

$$-0.15 < fn/ft < -0.05 \quad (2)$$

Next, technical meanings of the above-mentioned conditional expressions are described.

Conditional Expression (1) is a conditional expression to be satisfied in order to reduce the total lens length at the telephoto end while satisfactorily correcting the axial chromatic aberration and the chromatic aberration of magnification at the telephoto end. Conditional Expression (1) appropriately defines the focal length of the first lens unit L1 and the focal length of the zoom lens at the telephoto end.

When the focal length of the first lens unit L1 becomes longer so that the ratio of Conditional Expression (1) exceeds the upper limit of Conditional Expression (1), the amount of movement of the first lens unit L1 during zooming from the wide angle end to the telephoto end becomes too large. As a result, the total lens length at the telephoto end becomes longer, and it becomes difficult to achieve downsizing. When the focal length of the first lens unit L1 becomes shorter so that the ratio of Conditional Expression (1) falls below the lower limit of Conditional Expression (1), large amounts of axial chromatic aberration and chromatic aberration of magnification occur in the first lens unit L1, and it becomes difficult to correct the axial chromatic aberration and the chromatic aberration of magnification at the telephoto end.

Conditional Expression (2) appropriately defines the focal length of the lens unit Ln and the focal length of the zoom lens at the telephoto end to satisfactorily correct the chromatic aberration of magnification at the telephoto end. In general, the chromatic aberration of magnification is preferred to be corrected at a position at which an axial ray and an off-axial ray separate from each other. In such a zoom lens as in each Embodiment, the axial ray and the off-axial ray separate from each other more in an optical-axis orthogonal direction for a ray that passes through a lens unit arranged away from the aperture stop SP toward the image side than for a ray that passes through a lens unit near the aperture stop SP. Thus, it is effective to correct the chromatic aberration of magnification in the lens unit Ln, which is arranged at a position away from the aperture stop SP toward the image side.

When the negative focal length of the lens unit Ln becomes shorter so that the ratio of Conditional Expression (2) exceeds the upper limit of Conditional Expression (2) (when the absolute value of the negative focal length becomes smaller), the chromatic aberration of magnification at the telephoto end is corrected excessively, which is not preferred. When the negative focal length of the lens unit Ln becomes longer so that the ratio of Conditional Expression (2) falls below the lower limit of Conditional Expression (2) (when the absolute value of the negative focal length becomes larger), it becomes difficult to satisfactorily correct the chromatic aberration of magnification at the telephoto end, which is not preferred.

It is more preferred to set the numerical ranges of Conditional Expressions (1) and (2) as follows.

$$0.25 < f1/ft < 0.42 \quad (1a)$$

$$-0.13 < fn/ft < -0.07 \quad (2a)$$

It is still more preferred to set the numerical ranges of Conditional Expressions (1a) and (2a) as follows.

$$0.30 < f1/ft < 0.39 \quad (1b)$$

$$-0.12 < fn/ft < -0.08 \quad (2b)$$

Through the above-mentioned configuration, it is possible to obtain a zoom lens having a short total lens length, in which the chromatic aberration is satisfactorily corrected at the telephoto end.

In each Embodiment, it is more preferred to satisfy at least one of the following conditional expressions.

An average value of Abbe numbers of materials of all the negative lenses included in the lens unit Ln with respect to the d-line is represented by "vdnave". An average value of Abbe numbers of materials of all the positive lenses included in the first lens unit L1 with respect to the d-line is represented by "vd1pave". A distance from a lens surface closest to the image side to a paraxial image plane on the optical axis in the lens unit Ln at the wide angle end is represented by Lnwi, and a distance from a lens surface closest to the image side to a paraxial image plane on the optical axis in the lens unit Ln at the telephoto end is represented by Lnti.

The focal length of the first positive lens is represented by f11, and the focal length of the second positive lens is represented by f12. The lens unit Ln consists of two negative lenses, namely, an n1 lens having a negative refractive power and an n2 lens having a negative refractive power, in order from the object side to the image side, and the focal length of the n1 lens and the focal length of the n2 lens are represented by fn1 and fn2, respectively. The focal length of the zoom lens at the wide angle end is represented by "fw". The lateral magnification of the lens unit Ln at the wide angle end is represented by "βwn", and the lateral magnification of the lens unit Ln at the telephoto end is represented by "βtn".

At this time, it is preferred to satisfy at least one of the following conditional expressions.

$$65 < vdnave \quad (3)$$

$$70 < vd1pave \quad (4)$$

$$0.05 < Lnwi/Lnti < 0.25 \quad (5)$$

$$0.70 < f11/f12 < 1.20 \quad (6)$$

$$0.60 < fn1/fn2 < 1.30 \quad (7)$$

$$3.5 < ft/fw < 8.0 \quad (8)$$

$$1.20 < βtn/βwn < 3.00 \quad (9)$$

Next, technical meanings of the above-mentioned conditional expressions are described.

Conditional Expression (3) appropriately defines the average value of Abbe numbers of materials of all the negative lenses included in the lens unit Ln with respect to the d-line to satisfactorily correct the chromatic aberration of magnification at the telephoto end. The chromatic aberration of magnification at the telephoto end is satisfactorily corrected by setting the average value of Abbe numbers of materials of all the negative lenses included in the lens unit Ln with respect to the d-line so that the average value does not fall below the lower limit of Conditional Expression (3).

Conditional Expression (4) appropriately defines the average value of Abbe numbers of materials of all the positive lenses included in the first lens unit L1 with respect to the d-line to satisfactorily correct the axial chromatic aberration and the chromatic aberration of magnification at the telephoto end. The axial chromatic aberration and the chromatic aberration of magnification at the telephoto end are satisfactorily corrected by setting the average value of Abbe numbers of materials of all the positive lenses included in the first lens unit L1 with respect to the d-line so that the average value does not fall below the lower limit of Conditional Expression (4).

Conditional Expression (5) appropriately defines a distance (back focus) from a lens surface closest to the image side to a paraxial image plane on the optical axis in the lens unit Ln at the wide angle end and a distance from a lens surface closest to the image side to a paraxial image plane on the optical axis in the lens unit Ln at the telephoto end. When the back focus at the wide angle end becomes longer or the back focus at the telephoto end becomes shorter so that the ratio of Conditional Expression (5) exceeds the upper limit of Conditional Expression (5), it becomes difficult to correct the chromatic aberration of magnification at both of the wide angle end and the telephoto end. When the back focus at the telephoto end becomes longer so that the ratio of Conditional Expression (5) falls below the lower limit of Conditional Expression (5), the total lens length at the telephoto end becomes longer, and it thus becomes difficult to achieve downsizing.

Conditional Expression (6) appropriately defines the focal lengths of the first positive lens and second positive lens included in the first lens unit L1. When the focal length of the first positive lens becomes longer so that the ratio of Conditional Expression (6) exceeds the upper limit of Conditional Expression (6), it becomes difficult to satisfactorily correct the axial chromatic aberration and the chromatic aberration of magnification at the telephoto end. When the focal length of the first positive lens becomes shorter so that the ratio of Conditional Expression (6) falls below the lower limit of Conditional Expression (6), it becomes difficult to satisfactorily correct the spherical aberration at the telephoto end.

Conditional Expression (7) appropriately defines the focal lengths of the n1 lens and n2 lens included in the lens unit Ln. When the negative focal length of the n2 lens becomes shorter so that the ratio of Conditional Expression (7) exceeds the upper limit of Conditional Expression (7), the chromatic aberration of magnification at the telephoto end is corrected excessively, which is not preferred. When the negative focal length of the n2 lens becomes longer so that the ratio of Conditional Expression (7) falls below the lower limit of Conditional Expression (7), it becomes difficult to satisfactorily correct the chromatic aberration of magnification at the telephoto end.

Conditional Expression (8) defines a zoom ratio of the zoom lens. The zoom lens is downsized while maintaining a high optical performance over the entire zoom range by preventing the zoom ratio from exceeding the upper limit value of Conditional Expression (8). An appropriate photographing angle of view is obtained at various kinds of photography scenes by preventing the zoom ratio from falling below the lower limit value of Conditional Expression (8).

Conditional Expression (9) appropriately defines the lateral magnification of the lens unit Ln at the telephoto end and the lateral magnification of the lens unit Ln at the wide angle end. When the lateral magnification of the lens unit Ln at the telephoto end becomes larger so that the ratio of Conditional Expression (9) exceeds the upper limit value of Conditional Expression (9), it becomes difficult to satisfactorily correct the chromatic aberration of magnification at the telephoto end. When the lateral magnification of the lens unit Ln at the telephoto end becomes smaller so that the ratio of Conditional Expression (9) falls below the lower limit value of Conditional Expression (9), it becomes difficult to reduce the total lens length at the telephoto end.

In each Embodiment, it is preferred to set the numerical ranges of Conditional Expressions (3) to (9) as follows.

$$68 < vdnave \quad (3a)$$

$$75 < vd1pave \quad (4a)$$

$$0.08 < Lnwi/Lnti < 0.22 \quad (5a)$$

$$0.75 < f11/f12 < 1.15 \quad (6a)$$

$$0.65 < fn1/fn2 < 1.25 \quad (7a)$$

$$4.0 < ft/fw < 7.0 \quad (8a)$$

$$1.50 < \beta tn/\beta wn < 2.50 \quad (9a)$$

Moreover, it is further preferred to set the numerical ranges of Conditional Expressions (3a) to (9a) as follows. With this, the effect represented by each of the conditional expressions described above can be maximally obtained.

$$73 < vdnave \quad (3b)$$

$$80 < vd1pave \quad (4b)$$

$$0.12 < Lnwi/Lnti < 0.19 \quad (5b)$$

$$0.80 < f11/f12 < 1.12 \quad (6b)$$

$$0.70 < fn1/fn2 < 1.20 \quad (7b)$$

$$4.5 < ft/fw < 6.0 \quad (8b)$$

$$1.70 < \beta tn/\beta wn < 2.30 \quad (9b)$$

In each Embodiment, a small zoom lens in which the chromatic aberration is satisfactorily corrected at the telephoto end is obtained by constructing each component as described above.

In each Embodiment, the second lens unit L2 having a negative refractive power or a part of the second lens unit L2 may be moved so as to have a component in a direction orthogonal to the optical axis, to thereby shift the image in the direction orthogonal to the optical axis. With this, it becomes easier to correct blur (image blur) of an image photographed when the entire optical system (zoom lens) has vibrated (tilted).

In each Embodiment, the movement method at a time when image blur correction is performed by moving the second lens unit L2 or a part thereof in the direction orthogonal to the optical axis may be any movement method as long as the second lens unit L2 or a part thereof is moved to have a component in the direction orthogonal to the optical axis. For example, when the lens barrel is allowed to be complicated, the second lens unit L2 or a part thereof may be rotated so as to have a center of rotation on the optical axis, to thereby perform image blur correction. Further, image blur correction may be performed in the third lens unit L3. Still further, the image blur correction may be performed by simultaneously moving a plurality of lens units or a part of the lens unit.

In such a zoom lens having a longer focal length at the telephoto end as in each Embodiment, each lens unit is desired to be constructed by the following lenses arranged in order from the object side to the image side. In the following, it is assumed that each lens unit is arranged in order from the object side to the image side unless otherwise specified.

The first lens unit L1 is preferred to include a lens 11 (hereinafter simply referred to as "positive lens 11") having a positive refractive power and a cemented lens obtained by cementing a positive lens 12 and a lens 13 (hereinafter simply referred to as "negative lens 13") having a negative refractive power. Specifically, in Embodiments 1, 3, and 4, the first lens unit L1 is preferred to consist of the positive lens 11 and the cemented lens obtained by cementing the positive lens 12 and the negative lens 13. Alternatively, the first lens unit L1 is preferred to consist of the positive lens 11, the cemented lens obtained by cementing the positive lens 12 and the negative lens 13, and a positive lens 14 as in Embodiment 2.

It becomes easier to satisfactorily correct the spherical aberration, axial chromatic aberration, and chromatic aberration of magnification at the telephoto end by constructing the first lens unit L1 in this manner.

In Embodiments 1 and 2, the second lens unit L2 consists of a negative lens 21 and a cemented lens obtained by cementing a negative lens 22 and a positive lens 23. In Embodiments 3 and 4, the second lens unit L2 is preferred to consist of a cemented lens obtained by cementing a positive lens 21 and a negative lens 22, a negative lens 23, and a cemented lens obtained by cementing a negative lens 24 with and positive lens 25. It becomes easier to satisfactorily correct the curvature of field and the chromatic aberration of magnification at the wide angle end by constructing the second lens unit L2 in this manner.

The third lens unit L3 is preferred to consist of a positive lens 31, and a cemented lens obtained by cementing a positive lens 32 and a negative lens 33. It becomes easier to satisfactorily correct the spherical aberration and axial chromatic aberration over the entire zoom range by constructing the third lens unit L3 in this manner.

In Embodiment 1, the fourth lens unit L4 consists of a cemented lens obtained by cementing a negative lens 41 and a positive lens 42. In Embodiments 2, 3, and 4, the fourth lens unit L4 is preferred to consist of the negative lens 41. Further, the negative lens 41 is preferred to have a shape that is concave toward the object side. It becomes easier to satisfactorily correct the spherical aberration over the entire zoom range by constructing the fourth lens unit L4 in this manner. Further, it becomes easier to suppress a variation in spherical aberration during focusing in the entire zoom range.

In Embodiments 1 and 2, the fifth lens unit L5 is preferred to consist of a positive lens 51, a cemented lens obtained by cementing a positive lens 52 and a negative lens 53, and a positive lens 54. In Embodiments 3 and 4, the fifth lens unit L5 is preferred to consist of the positive lens 51 and a cemented lens obtained by cementing the positive lens 52 and the negative lens 53. It becomes easier to satisfactorily correct the spherical aberration, coma, and axial chromatic aberration over the entire zoom range by constructing the fifth lens unit L5 in this manner.

The sixth lens unit L6 is preferred to consist of a cemented lens obtained by cementing a positive lens 61 and a negative lens 62. Further, the negative lens 62 is preferred to have a shape that is concave toward the image side. It becomes easier to satisfactorily correct the coma and the curvature of field over the entire zoom range by constructing the sixth lens unit L6 in this manner. Further, it becomes easier to suppress a variation in axial chromatic aberration or chromatic aberration of magnification during focusing in the entire zoom range.

The seventh lens unit L7 is preferred to consist of a cemented lens obtained by cementing a positive lens 71 and a negative lens 72. It becomes easier to satisfactorily correct the chromatic aberration of magnification particularly at the telephoto end by constructing the seventh lens unit L7 in this manner.

The eighth lens unit L8 is preferred to consist of a cemented lens obtained by cementing a negative lens 81, a negative lens 82, and a positive lens 83. It becomes easier to satisfactorily correct the chromatic aberration of magnification particularly at the telephoto end by constructing the eighth lens unit L8 in this manner.

In Embodiment 4, the ninth lens unit L9 is preferred to consist of a negative lens 91. It becomes easier to satisfactorily correct the curvature of field over the entire zoom range by constructing the ninth lens unit L9 in this manner.

According to each Embodiment, through the above-mentioned configuration, it becomes easier to obtain a compact zoom lens in which the chromatic aberration is satisfactorily corrected at the telephoto end.

Next, referring to FIG. 9, an example of a digital camera using the zoom lens according to embodiments of the present invention as the image pickup optical system is described. In FIG. 9, a camera main body 10 and an image pickup optical system 11 constructed by the zoom lens according to any one of Embodiments 1 to 4 are illustrated. An image pickup element (photoelectric conversion element) 12, such as a CCD sensor or a CMOS sensor, is incorporated into the camera main body, and is configured to receive an object image formed by the image pickup optical system 11. A lens apparatus (image pickup apparatus) 13 includes the image pickup optical system 11.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The configuration of the rear lens group LR including a plurality of lens units is not limited to the configuration in which the rear lens group LR consists of four or five lens units, which is illustrated in Embodiments. The rear lens group LR may consist of three or less lens units or six or more lens units when the zoom lens includes a lens unit having a negative refractive power, which satisfies Conditional Expression (2), relatively on the image side of the zoom lens.

Next, Numerical Embodiments 1 to 4 corresponding to Embodiments 1 to 4 of the present invention are described. In each Embodiment, "i" represents the order of a surface counted from the object side, "ri" represents a curvature radius of a lens surface, "di" represents a lens thickness or an air gap between an i-th surface and an (i+1)th surface, and "ndi" and "vdi" represent a refractive index and an Abbe number of an optical medium between the i-th surface and the (i+1)th surface with respect to the d-line, respectively.

In each Numerical Embodiment, the last two surfaces are surfaces of an optical block such as a filter or a face plate.

In each Embodiment, back focus (BF) corresponds to a distance on the optical axis from a final lens surface to a paraxial image plane, and the distance is represented by an air-equivalent length. A total lens length is obtained by adding the back focus to a distance from a surface closest to the object side to the final lens surface. Moreover, correspondence between each of Numerical Embodiments and the conditional expressions given above is shown in Table 1.

Numerical Embodiment 1

Unit: mm

Surface data

| Surface number | r | d | nd | vd |
|---|---|---|---|---|
| 1 | 125.878 | 13.66 | 1.49700 | 81.5 |
| 2 | −394.145 | 0.23 | | |
| 3 | 173.206 | 12.00 | 1.43875 | 94.7 |
| 4 | −260.097 | 2.40 | 1.88300 | 40.8 |
| 5 | 629.720 | (Variable) | | |
| 6 | −557.143 | 1.50 | 1.77250 | 49.6 |
| 7 | 68.411 | 5.00 | | |
| 8 | −103.764 | 1.50 | 1.49700 | 81.5 |
| 9 | 63.855 | 5.00 | 1.71736 | 29.5 |
| 10 | −4,870.716 | (Variable) | | |
| 11 | 44.113 | 7.60 | 1.43875 | 94.7 |
| 12 | −131.977 | 0.15 | | |
| 13 | 70.184 | 5.30 | 1.51742 | 52.4 |
| 14 | −149.068 | 1.60 | 1.91082 | 35.3 |
| 15 | 227.603 | 2.50 | | |
| 16 (Stop) | ∞ | (Variable) | | |
| 17 | −39.659 | 1.00 | 1.77250 | 49.6 |
| 18 | 120.000 | 3.00 | 1.58144 | 40.8 |
| 19 | −201.574 | (Variable) | | |
| 20 | −188.106 | 4.15 | 1.59551 | 39.2 |
| 21 | −36.089 | 10.00 | | |
| 22 | 179.927 | 5.00 | 1.48749 | 70.2 |
| 23 | −33.258 | 1.20 | 2.00100 | 29.1 |
| 24 | −72.041 | 0.20 | | |
| 25 | 40.646 | 3.00 | 1.51633 | 64.1 |
| 26 | 264.879 | (Variable) | | |
| 27 | −220.976 | 3.10 | 1.80518 | 25.4 |
| 28 | −38.213 | 1.20 | 1.80400 | 46.5 |
| 29 | 37.945 | (Variable) | | |
| 30 | 62.413 | 6.09 | 1.51823 | 58.9 |
| 31 | −39.273 | 1.60 | 1.92286 | 20.9 |
| 32 | −48.247 | (Variable) | | |
| 33 | −66.555 | 1.45 | 1.59522 | 67.7 |
| 34 | 56.205 | 3.50 | | |
| 35 | −121.798 | 1.50 | 1.49700 | 81.5 |
| 36 | 42.015 | 5.73 | 1.67300 | 38.3 |
| 37 | −880.714 | (Variable) | | |
| 38 | ∞ | 1.00 | 1.51633 | 64.1 |
| 39 | ∞ | 1.00 | | |
| Image plane | ∞ | | | |

Various data
Zoom ratio 5.83

| | Wide angle | Intermediate | Telephoto |
|---|---|---|---|
| Focal length | 103.00 | 248.70 | 600.00 |
| F-number | 4.60 | 5.85 | 6.80 |
| Half angle of view (degrees) | 11.86 | 4.97 | 2.07 |
| Image height | 21.64 | 21.64 | 21.64 |
| Total lens length | 238.44 | 305.28 | 331.62 |
| BF | 13.96 | 30.69 | 82.37 |
| d5 | 4.00 | 70.84 | 97.18 |
| d10 | 41.59 | 33.92 | 1.35 |
| d16 | 7.17 | 11.92 | 13.23 |
| d19 | 8.67 | 3.91 | 2.61 |
| d26 | 13.52 | 6.58 | 2.00 |
| d29 | 9.20 | 16.14 | 20.72 |
| d32 | 30.16 | 21.11 | 2.00 |
| d37 | 12.30 | 29.03 | 80.71 |

-continued

Unit: mm

Lens unit data

| Unit | First surface | Focal length |
|---|---|---|
| 1 | 1 | 207.63 |
| 2 | 6 | −71.99 |
| 3 | 11 | 69.87 |
| 4 | 17 | −55.38 |
| 5 | 20 | 42.72 |
| 6 | 27 | −40.02 |
| 7 | 30 | 59.31 |
| 8 | 33 | −54.02 |

Single lens data

| Lens | First surface | Focal length |
|---|---|---|
| 1 | 1 | 193.66 |
| 2 | 3 | 238.99 |
| 3 | 4 | −208.20 |
| 4 | 6 | −78.79 |
| 5 | 8 | −79.30 |
| 6 | 9 | 87.90 |
| 7 | 11 | 76.36 |
| 8 | 13 | 92.99 |
| 9 | 14 | −98.69 |
| 10 | 17 | −38.48 |
| 11 | 18 | 129.81 |
| 12 | 20 | 74.23 |
| 13 | 22 | 58.03 |
| 14 | 23 | −62.69 |
| 15 | 25 | 92.57 |
| 16 | 27 | 56.95 |
| 17 | 28 | −23.52 |
| 18 | 30 | 47.49 |
| 19 | 31 | −250.21 |
| 20 | 33 | −50.97 |
| 21 | 35 | −62.66 |
| 22 | 36 | 59.74 |

Numerical Embodiment 2

Unit: mm

Surface data

| Surface number | r | d | nd | vd |
|---|---|---|---|---|
| 1 | 134.914 | 9.79 | 1.49700 | 81.5 |
| 2 | −6,721.245 | 0.23 | | |
| 3 | 137.154 | 12.00 | 1.43875 | 94.7 |
| 4 | −425.440 | 2.40 | 1.88300 | 40.8 |
| 5 | 298.947 | 2.00 | | |
| 6 | 268.064 | 6.50 | 1.49700 | 81.5 |
| 7 | −999.736 | (Variable) | | |
| 8 | −857.743 | 1.50 | 1.77250 | 49.6 |
| 9 | 60.559 | 5.50 | | |
| 10 | −91.937 | 1.50 | 1.49700 | 81.5 |
| 11 | 60.619 | 5.00 | 1.71736 | 29.5 |
| 12 | −1,482.613 | (Variable) | | |
| 13 | 49.993 | 7.60 | 1.43875 | 94.7 |
| 14 | −102.834 | 0.15 | | |
| 15 | 80.657 | 5.00 | 1.51742 | 52.4 |
| 16 | −155.188 | 1.60 | 1.91082 | 35.3 |
| 17 | 511.702 | 2.50 | | |
| 18 (Stop) | ∞ | (Variable) | | |
| 19 | −42.764 | 1.30 | 1.77250 | 49.6 |
| 20 | −92,692.282 | (Variable) | | |
| 21 | −188.510 | 4.03 | 1.59551 | 39.2 |
| 22 | −37.719 | 5.58 | | |
| 23 | 257.937 | 4.62 | 1.48749 | 70.2 |
| 24 | −36.110 | 1.20 | 2.00100 | 29.1 |
| 25 | −76.229 | 0.20 | | |
| 26 | 45.741 | 3.00 | 1.51633 | 64.1 |
| 27 | 233.297 | (Variable) | | |
| 28 | −419.106 | 3.17 | 1.80518 | 25.4 |
| 29 | −38.129 | 1.20 | 1.80400 | 46.5 |
| 30 | 39.290 | (Variable) | | |
| 31 | 64.867 | 5.46 | 1.51823 | 58.9 |
| 32 | −34.694 | 1.60 | 1.92286 | 20.9 |
| 33 | −45.897 | (Variable) | | |
| 34 | −81.065 | 1.45 | 1.53775 | 74.7 |
| 35 | 57.898 | 3.50 | | |
| 36 | −130.610 | 1.50 | 1.49700 | 81.5 |
| 37 | 65.180 | 3.50 | 1.73800 | 32.3 |
| 38 | 584.985 | (Variable) | | |
| 39 | ∞ | 1.00 | 1.51633 | 64.1 |
| 40 | ∞ | 1.00 | | |
| Image plane | ∞ | | | |

Various data
Zoom ratio 5.83

| | Wide angle | Intermediate | Telephoto |
|---|---|---|---|
| Focal length | 103.00 | 248.50 | 600.00 |
| F-number | 4.60 | 5.85 | 6.80 |
| Half angle of view (degrees) | 11.86 | 4.98 | 2.07 |
| Image height | 21.64 | 21.64 | 21.64 |
| Total lens length | 241.66 | 305.61 | 331.66 |
| BF | 17.57 | 37.01 | 97.33 |
| d7 | 2.00 | 63.58 | 86.90 |
| d12 | 41.59 | 35.60 | 1.35 |
| d18 | 5.54 | 9.90 | 10.19 |
| d20 | 12.06 | 7.70 | 7.41 |
| d27 | 14.35 | 5.60 | 2.00 |
| d30 | 7.56 | 16.31 | 19.91 |
| d33 | 36.42 | 25.33 | 2.00 |
| d38 | 15.91 | 35.35 | 95.67 |

Lens unit data

| Unit | First surface | Focal length |
|---|---|---|
| 1 | 1 | 187.17 |
| 2 | 8 | −66.90 |
| 3 | 13 | 66.06 |
| 4 | 19 | −55.38 |
| 5 | 21 | 46.08 |
| 6 | 28 | −44.55 |
| 7 | 31 | 61.55 |
| 8 | 34 | −57.39 |

Single lens data

| Lens | First surface | Focal length |
|---|---|---|
| 1 | 1 | 266.24 |
| 2 | 3 | 237.94 |
| 3 | 4 | −198.53 |
| 4 | 6 | 426.05 |
| 5 | 8 | −73.17 |
| 6 | 10 | −73.27 |
| 7 | 11 | 81.29 |
| 8 | 13 | 77.85 |
| 9 | 15 | 103.32 |
| 10 | 16 | −130.58 |
| 11 | 19 | −55.38 |
| 12 | 21 | 78.40 |
| 13 | 23 | 65.31 |
| 14 | 24 | −69.58 |
| 15 | 26 | 109.60 |
| 16 | 28 | 51.90 |
| 17 | 29 | −23.90 |
| 18 | 31 | 44.45 |

-continued

| Unit: mm | | |
|---|---|---|
| 19 | 32 | −165.35 |
| 20 | 34 | −62.58 |
| 21 | 36 | −87.27 |
| 22 | 37 | 99.11 |

Numerical Embodiment 3

Unit: mm

Surface data

| Surface number | r | d | nd | vd |
|---|---|---|---|---|
| 1 | 139.899 | 11.00 | 1.49700 | 81.5 |
| 2 | −725.218 | 0.50 | | |
| 3 | 137.265 | 9.80 | 1.43875 | 94.7 |
| 4 | −864.666 | 2.40 | 1.83481 | 42.7 |
| 5 | 266.138 | (Variable) | | |
| 6 | 116.936 | 5.20 | 1.57501 | 41.5 |
| 7 | −98.739 | 1.30 | 1.77250 | 49.6 |
| 8 | 90.713 | 3.40 | | |
| 9 | −1,515.584 | 1.70 | 1.77250 | 49.6 |
| 10 | 111.336 | 1.70 | | |
| 11 | 2,482.774 | 1.70 | 1.49700 | 81.5 |
| 12 | 65.651 | 4.00 | 1.63980 | 34.5 |
| 13 | 349.948 | (Variable) | | |
| 14 | 57.517 | 6.50 | 1.43875 | 94.7 |
| 15 | −130.235 | 0.15 | | |
| 16 | 105.689 | 5.00 | 1.51823 | 58.9 |
| 17 | −136.115 | 1.60 | 1.83481 | 42.7 |
| 18 | −1,116.555 | 2.50 | | |
| 19 (Stop) | ∞ | (Variable) | | |
| 20 | −52.949 | 1.50 | 1.77250 | 49.6 |
| 21 | −1,031.670 | (Variable) | | |
| 22 | 282.299 | 4.99 | 1.58144 | 40.8 |
| 23 | −51.259 | 7.96 | | |
| 24 | 61.917 | 5.47 | 1.48749 | 70.2 |
| 25 | −47.586 | 1.20 | 2.00100 | 29.1 |
| 26 | −127.040 | (Variable) | | |
| 27 | −12,810.854 | 2.74 | 1.80518 | 25.4 |
| 28 | −59.209 | 1.20 | 1.80400 | 46.5 |
| 29 | 40.324 | (Variable) | | |
| 30 | 65.917 | 4.88 | 1.51823 | 58.9 |
| 31 | −46.560 | 1.60 | 1.92286 | 20.9 |
| 32 | −62.745 | (Variable) | | |
| 33 | −232.616 | 1.45 | 1.59282 | 68.6 |
| 34 | 45.680 | 4.20 | | |
| 35 | −78.865 | 1.50 | 1.49700 | 81.5 |
| 36 | 47.251 | 5.27 | 1.72047 | 34.7 |
| 37 | −812.592 | (Variable) | | |
| 38 | ∞ | 1.00 | 1.51633 | 64.1 |
| 39 | ∞ | 1.00 | | |
| Image plane | ∞ | | | |

Various data
Zoom ratio 5.69

| | Wide angle | Intermediate | Telephoto |
|---|---|---|---|
| Focal length | 123.00 | 293.00 | 700.00 |
| F-number | 4.60 | 5.85 | 8.00 |
| Half angle of view (degrees) | 9.98 | 4.22 | 1.77 |
| Image height | 21.64 | 21.64 | 21.64 |
| Total lens length | 246.28 | 322.64 | 370.48 |
| BF | 14.01 | 44.69 | 107.78 |
| d5 | 1.50 | 74.51 | 118.12 |
| d13 | 45.00 | 31.94 | 1.35 |
| d19 | 6.30 | 11.18 | 10.01 |
| d21 | 8.70 | 3.83 | 5.00 |
| d26 | 11.48 | 4.00 | 1.20 |
| d29 | 12.33 | 19.81 | 22.62 |
| d32 | 44.54 | 30.26 | 2.00 |
| d37 | 12.35 | 43.03 | 106.12 |

Lens unit data

| Unit | First surface | Focal length |
|---|---|---|
| 1 | 1 | 247.49 |
| 2 | 6 | −80.80 |
| 3 | 14 | 70.63 |
| 4 | 20 | −72.30 |
| 5 | 22 | 55.88 |
| 6 | 27 | −50.04 |
| 7 | 30 | 72.81 |
| 8 | 33 | −62.05 |

Single lens data

| Lens | First surface | Focal length |
|---|---|---|
| 1 | 1 | 236.97 |
| 2 | 3 | 270.80 |
| 3 | 4 | −243.54 |
| 4 | 6 | 93.93 |
| 5 | 7 | −61.02 |
| 6 | 9 | −134.20 |
| 7 | 11 | −135.71 |
| 8 | 12 | 125.62 |
| 9 | 14 | 91.90 |
| 10 | 16 | 115.62 |
| 11 | 17 | −185.82 |
| 12 | 20 | −72.30 |
| 13 | 22 | 75.02 |
| 14 | 24 | 56.11 |
| 15 | 25 | −76.59 |
| 16 | 27 | 73.87 |
| 17 | 28 | −29.68 |
| 18 | 30 | 53.44 |
| 19 | 31 | −205.33 |
| 20 | 33 | −64.28 |
| 21 | 35 | −59.22 |
| 22 | 36 | 62.14 |

Numerical Embodiment 4

Unit: mm

Surface data

| Surface number | r | d | nd | vd |
|---|---|---|---|---|
| 1 | 132.456 | 10.00 | 1.49700 | 81.5 |
| 2 | −625.423 | 0.50 | | |
| 3 | 145.081 | 9.10 | 1.43875 | 94.7 |
| 4 | −565.251 | 2.40 | 1.83481 | 42.7 |
| 5 | 286.490 | (Variable) | | |
| 6 | 125.458 | 5.20 | 1.57501 | 41.5 |
| 7 | −101.387 | 1.30 | 1.77250 | 49.6 |
| 8 | 111.773 | 3.40 | | |
| 9 | 2,034.061 | 1.70 | 1.77250 | 49.6 |
| 10 | 105.701 | 2.70 | | |
| 11 | −421.286 | 1.70 | 1.49700 | 81.5 |
| 12 | 67.536 | 3.50 | 1.63980 | 34.5 |
| 13 | 303.714 | (Variable) | | |
| 14 | 64.721 | 6.00 | 1.43875 | 94.7 |
| 15 | −144.502 | 0.15 | | |
| 16 | 122.285 | 4.70 | 1.51823 | 58.9 |
| 17 | −136.115 | 1.60 | 1.83481 | 42.7 |
| 18 | −503.340 | 2.50 | | |

-continued

| Unit: mm | | | | |
|---|---|---|---|---|
| 19 (Stop) | ∞ | (Variable) | | |
| 20 | −60.867 | 1.50 | 1.77250 | 49.6 |
| 21 | 2,445.612 | (Variable) | | |
| 22 | 115.544 | 6.50 | 1.58144 | 40.8 |
| 23 | −58.890 | 4.31 | | |
| 24 | 72.494 | 5.34 | 1.48749 | 70.2 |
| 25 | −49.206 | 1.20 | 2.00100 | 29.1 |
| 26 | −155.810 | (Variable) | | |
| 27 | −2,965.051 | 2.98 | 1.80518 | 25.4 |
| 28 | −53.617 | 1.20 | 1.80400 | 46.5 |
| 29 | 43.670 | (Variable) | | |
| 30 | 66.451 | 5.41 | 1.51823 | 58.9 |
| 31 | −41.564 | 1.60 | 1.92286 | 20.9 |
| 32 | −58.619 | (Variable) | | |
| 33 | −200.908 | 1.45 | 1.59282 | 68.6 |
| 34 | 55.617 | 3.50 | | |
| 35 | −97.132 | 1.50 | 1.49700 | 81.5 |
| 36 | 50.159 | 5.00 | 1.72047 | 34.7 |
| 37 | −600.974 | (Variable) | | |
| 38 | −69.214 | 1.80 | 1.65160 | 58.5 |
| 39 | −133.310 | (Variable) | | |
| 40 | ∞ | 1.00 | 1.51633 | 64.1 |
| 41 | ∞ | 0.50 | | |
| Image plane | ∞ | | | |

Various data
Zoom ratio 5.30

| | Wide angle | Intermediate | Telephoto |
|---|---|---|---|
| Focal length | 122.75 | 282.00 | 650.00 |
| F-number | 4.60 | 5.85 | 8.00 |
| Half angle of view (degrees) | 10.00 | 4.39 | 1.91 |
| Image height | 21.64 | 21.64 | 21.64 |
| Total lens length | 252.02 | 324.42 | 363.59 |
| BF | 10.22 | 17.42 | 31.79 |
| d5 | 1.50 | 69.46 | 109.38 |
| d13 | 46.47 | 34.36 | 2.44 |
| d19 | 7.61 | 13.81 | 13.05 |
| d21 | 11.16 | 4.97 | 5.72 |
| d26 | 11.98 | 3.69 | 1.20 |
| d29 | 12.53 | 20.81 | 23.30 |
| d32 | 44.82 | 30.04 | 2.00 |
| d37 | 6.00 | 30.13 | 74.97 |
| d39 | 9.06 | 16.26 | 30.63 |

Lens unit data

| Unit | First surface | Focal length |
|---|---|---|
| 1 | 1 | 241.00 |
| 2 | 6 | −81.20 |
| 3 | 14 | 75.72 |
| 4 | 20 | −76.86 |
| 5 | 22 | 57.34 |
| 6 | 27 | −53.56 |
| 7 | 30 | 73.20 |
| 8 | 33 | −77.42 |
| 9 | 38 | −223.40 |

Single lens data

| Lens | First surface | Focal length |
|---|---|---|
| 1 | 1 | 220.90 |
| 2 | 3 | 264.16 |
| 3 | 4 | −227.46 |
| 4 | 6 | 98.34 |
| 5 | 7 | −68.64 |
| 6 | 9 | −144.39 |
| 7 | 11 | −116.98 |
| 8 | 12 | 134.96 |
| 9 | 14 | 102.78 |
| 10 | 16 | 125.07 |
| 11 | 17 | −223.93 |
| 12 | 20 | −76.86 |
| 13 | 22 | 68.02 |
| 14 | 24 | 61.00 |
| 15 | 25 | −72.25 |
| 16 | 27 | 67.79 |
| 17 | 28 | −29.77 |
| 18 | 30 | 50.20 |
| 19 | 31 | −162.10 |
| 20 | 33 | −73.32 |
| 21 | 35 | −66.33 |
| 22 | 36 | 64.46 |
| 23 | 38 | −223.40 |

TABLE 1

| | Numerical Embodiment | | | |
|---|---|---|---|---|
| Conditional Expression | 1 | 2 | 3 | 4 |
| (1) $0.20 < f1/ft < 0.45$ | 0.346 | 0.312 | 0.354 | 0.371 |
| (2) $-0.15 < fn/ft < -0.05$ | −0.090 | −0.096 | −0.089 | −0.119 |
| (3) $65 < vdnave$ | 74.6 | 78.1 | 75.1 | 75.1 |
| (4) $70 < vd1pave$ | 88.1 | 85.9 | 88.1 | 88.1 |
| (5) $0.05 < Lnwi/Lnti < 0.25$ | 0.169 | 0.180 | 0.130 | 0.169 |
| (6) $0.70 < f11/f12 < 1.20$ | 0.810 | 1.119 | 0.875 | 0.836 |
| (7) $0.60 < fn1/fn2 < 1.30$ | 0.813 | 0.717 | 1.086 | 1.105 |
| (8) $3.5 < ft/fw < 8.0$ | 5.83 | 5.83 | 5.69 | 5.30 |
| (9) $1.20 < \beta tn/\beta wn < 3.00$ | 1.888 | 1.978 | 2.104 | 1.844 |

According to the embodiments of the present invention, it is possible to achieve the compact zoom lens with a high zoom ratio, which has such a high optical performance that the chromatic aberration is satisfactorily corrected at the telephoto end in particular.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-224739, filed Nov. 30, 2018, which is hereby incorporated by reference herein in its entirety.

What is claimed is:

1. A zoom lens comprising, in order from an object side to an image side:
   a first lens unit having a positive refractive power;
   a second lens unit having a negative refractive power;
   a third lens unit having a positive refractive power; and
   a rear lens group including a plurality of lens units,
   wherein an interval between each pair of adjacent lens units is changed during zooming,
   wherein the rear lens group includes a lens unit Ln disposed closest to the image side among lens units including a positive lens and a negative lens, the first lens unit and the lens unit Ln are configured to move for zooming,
   wherein the first lens unit includes, in order from the object side to the image side, a first positive lens, a second positive lens, and a first negative lens, and wherein the following conditional expressions are satisfied:

$0.20 < f1/ft < 0.45;$ $-0.15 < fn/ft < -0.05,$ and $0.05 < Lnwi/Lnti < 0.25,$ where f1 is a focal length of the first lens unit, fn is a focal length of the lens unit Ln, ft is a focal length of the zoom lens at a telephoto end, Lnwi is a distance from a lens surface closest to the image side to a paraxial image plane on an optical axis in the lens unit Ln at a wide angle end, and Lnti is a distance from a lens surface closest to the image side to a paraxial image plane on the optical axis in the lens unit Ln at the telephoto end.

2. The zoom lens according to claim 1, wherein the following conditional expression is satisfied:

$65 < vdnave,$ where vdnave is an average value of Abbe numbers of materials of all the negative lenses included in the lens unit Ln with respect to a d-line.

3. The zoom lens according to claim 1, wherein the following conditional expression is satisfied:

$70 < vd1pave,$ where vd1pave is an average value of Abbe numbers of materials of all the positive lenses included in the first lens unit with respect to a d-line.

4. The zoom lens according to claim 1, wherein the following conditional expression is satisfied:

$0.70 < f11/f12 < 1.20,$ where f11 is a focal length of the first positive lens, and f12 is a focal length of the second positive lens.

5. The zoom lens according to claim 1,
wherein the lens unit Ln includes two negative lenses, and
wherein the following conditional expression is satisfied:

$0.60 < fn1/fn2 < 1.30,$ where fn1 is a focal length of a negative lens arranged on the object side among the two negative lenses, and fn2 is a focal length of a negative lens arranged on the image side among the two negative lenses.

6. The zoom lens according to claim 1, wherein the following conditional expression is satisfied:

$3.5 < ft/fw < 8.0$ where fw is a focal length of the zoom lens at a wide angle end.

7. The zoom lens according to claim 1, wherein the following conditional expression is satisfied:

$1.20 < \beta tn/\beta wn < 3.00,$ where βwn is a lateral magnification of the lens unit Ln at a wide angle end, and βtn is a lateral magnification of the lens unit Ln at the telephoto end.

8. The zoom lens according to claim 1, wherein the rear lens group consists of, in order from the object side to the image side, a fourth lens unit having a negative refractive power, a fifth lens unit having a positive refractive power, a sixth lens unit having a negative refractive power, a seventh lens unit having a positive refractive power, and an eighth lens unit having a negative refractive power.

9. The zoom lens according to claim 8, wherein the fourth lens unit and the sixth lens unit are configured to move along different loci for focusing.

10. The zoom lens according to claim 9, wherein the fourth lens unit and the sixth lens unit are configured to move toward the object side and the image side, respectively, for focusing from infinity to close distance.

11. The zoom lens according to claim 1, wherein the rear lens group consists of, in order from the object side to the image side, a fourth lens unit having a negative refractive power, a fifth lens unit having a positive refractive power, a sixth lens unit having a negative refractive power, a seventh lens unit having a positive refractive power, an eighth lens unit having a negative refractive power, and a ninth lens unit having a negative refractive power.

12. The zoom lens according to claim 1, wherein the lens unit Ln consists of, in order from the object side to the image side, a lens Gn1 having a negative refractive power, a lens Gn2 Having a negative refractive power, and a lens Gn3 having a positive refractive power.

13. An image pickup apparatus comprising:
a zoom lens; and
an image pickup element configured to receive an image formed by the zoom lens,
wherein the zoom lens comprises, in order from an object side to an image side:
a first lens unit having a positive refractive power;
a second lens unit having a negative refractive power;
a third lens unit having a positive refractive power; and
a rear lens group including a plurality of lens units,
wherein an interval between each pair of adjacent lens units is changed during zooming,
wherein the rear lens group includes a lens unit Ln disposed closest to the image side among lens units including a positive lens and a negative lens, the first lens unit and the lens unit Ln are configured to move for zooming,
wherein the first lens unit includes, in order from the object side to the image side, a first positive lens, a second positive lens, and a first negative lens, and
wherein the following conditional expressions are satisfied:

$0.20 < f1/ft < 0.45;$ $-0.15 < fn/ft < -0.05,$ and $0.05 < Lnwi/Lnti < 0.25,$ where f1 is a focal length of the first lens unit, fn is a focal length of the lens unit Ln, ft is a focal length of the zoom lens at a telephoto end, Lnwi is a distance from a lens surface closest to the image side to a paraxial image plane on an optical axis in the lens unit Ln at a wide angle end, and Lnti is a distance from a lens surface closest to the image side to a paraxial image plane on the optical axis in the lens unit Ln at the telephoto end.

14. A zoom lens comprising, in order from an object side to an image side:
a first lens unit having a positive refractive power;
a second lens unit having a negative refractive power;
a third lens unit having a positive refractive power; and
a rear lens group including a plurality of lens units,
wherein an interval between each pair of adjacent lens units is changed during zooming,
wherein the rear lens group includes a lens unit Ln disposed closest to the image side among lens units including a positive lens and a negative lens, the first lens unit and the lens unit Ln are configured to move for zooming, wherein the lens unit Ln includes two negative lenses, and wherein the first lens unit includes, in order from the object side to the image side, a first positive lens, a second positive lens, and a first negative lens, and wherein the following conditional expressions are satisfied:

$$0.20 < f1/ft < 0.45;$$

$$-0.15 < fn/ft < -0.05, \text{ and}$$

$$0.60 < fn1/fn2 < 1.30,$$

where f1 is a focal length of the first lens unit, fn is a focal length of the lens unit Ln, ft is a focal length of the zoom lens at a telephoto end, fn1 is a focal length of a negative lens arranged on the object side among the two negative lenses, and fn2 is a focal length of a negative lens arranged on the image side among the two negative lenses.

* * * * *